United States Patent
Miller

[11] Patent Number: 5,534,738
[45] Date of Patent: Jul. 9, 1996

[54] MOTOR HAVING NON-COAXIAL, SYNCHRONIZED ROTORS

[76] Inventor: George Miller, 2976 Shaffer Rd., Atwater, Ohio 44201

[21] Appl. No.: 488,835

[22] Filed: Jun. 9, 1995

[51] Int. Cl.$^6$ .................................................. H02K 23/60
[52] U.S. Cl. .............................. 310/115; 310/114
[58] Field of Search .......................... 310/114, 10, 115, 310/249, 137, 273, 21, 32, 92, 96, 98

[56] References Cited

U.S. PATENT DOCUMENTS 2,279,690  11/1939  Lindsey ................................. 171/252
2,462,182   2/1949  Guerdan et al. ....................... 172/36

Primary Examiner—Steven L. Stephan
Assistant Examiner—Jonathan Link
Attorney, Agent, or Firm—Terrance L. Siemens

[57] ABSTRACT

An improved electric motor comprising two rotatable members. The members have rotational axes arranged at an angle to and intersecting one another. The members rotate in tandem, so that an arbitrarily selected point on the end of one member has a corresponding point located on the opposing end of the other member. The paired points pass through a cycle wherein they progressively approach one another, then spread apart. This cycle repeats. Electromagnets are disposed upon each rotatable member in the manner of the corresponding points, so that their flux fields enjoy the benefit of cyclic variable proximity. This arrangement increases the efficiency of electric motors. Electric power for energizing the coils of the electromagnets is switched by an energized member interposed between the rotatable members. The energized member contacts brushes mounted on the rotatable members. Rotation causes the brushes to contact and lose contact with appropriately energized conductors located on the energized member. The electromagnets are thus cyclically energized and deenergized so that attraction occurs as the electromagnets approach one another, and repulsion ensues as the electromagnets diverge. In an alternative embodiment, electromagnets of one rotating member are maintained at one polarity, and polarity of electromagnets of the other member is switched appropriately.

17 Claims, 4 Drawing Sheets

MOTOR HAVING NON-COAXIAL, SYNCHRONIZED ROTORS

BACKGROUND OF THE INVENTION

1. Field of the Invention

The present invention relates to an improved electric motor wherein mutually attracted and repelled magnets are mounted on rotating members having rotational axes arranged at an angle to one another. The rotating members approach and recede from one another generally in the manner of gears having intersecting axes. However, although the members rotate at the same rate, they are not mechanically connected, and do not touch one another. An arbitrary point located on one rotating member varies from a position at a maximum distance from its counterpart on the other member to a minimum separation distance from its counterpart when the member has rotated one hundred eighty degrees. Continued rotation returns the point to the maximally spaced position. The variable proximity of the magnets improves motor performance due to magnetic attraction becoming stronger with closer proximity.

2. Description of the Prior Art

Electric motors exist in many configurations, particularly in variations in the arrangement of magnetic members. The precise selected arrangement is determined primarily by the desired performance characteristics of the individual motor, as reflected by the torque curve, stall characteristics, and the like. The following references are exemplary.

Advances in stepping motors are shown in U.S. Pat. Nos. 3,596,119, issued to Herbert Goldman on Jul. 27, 1971 and 4,626,719, issued to Ronald K. Foster on Dec. 2, 1986. Improvements in synchronous and asynchronous dynamo machines, this being relevant since motors and generators are functionally the opposite of one another, are shown in U.S. Pat. Nos. 4,556,809, issued to Achim Beisse et al. on Dec. 3, 1985, 4,577,126, issued to Alain-Jacques Mailfert on Mar. 18, 1986, and 5,281,879, issued to Toshihiko Satake et al. on Jan. 25, 1994.

In the above examples, motors of a particular type are changed to improve one area of performance, in order to achieve a specific objective. The prior art, including but not limited to the above cited references, does not show variable proximity of paired interacting magnets disposed upon rotating members arranged according to the present invention.

None of the above inventions and patents, taken either singly or in combination, is seen to describe the instant invention as claimed.

SUMMARY OF THE INVENTION

The present invention provides an electric motor which exploits alternating variable proximity of magnets to enhance effectiveness of magnetic attraction and repulsion.

The motor comprises two rotatable members arranged to have rotational axes oriented at an angle to and intersecting one another. Each member has a face opposing its counterpart on the other member. As both members rotate, an arbitrarily selected point on one face cyclically approaches and distances itself from a corresponding selected point on the other face.

Each member has four or possibly more electromagnets mounted thereto on its face, spaced evenly about the respective axis. Corresponding opposed electromagnets are energized to exhibit opposite polarity when they are achieving increasing proximity. Thus, the mutually attracting magnetic flux fields take advantage of the variable proximity to increase effectiveness. Stated another way, when two attracting magnets are separated from one another by being mounted on opposite inclined faces of rotating members, and when the only way the magnets can approach one another is by rotating the members, the attractive force of the magnets will cause the rotation required to geometrically move the magnets closer to one another. Of course, the same sort of action is involved if the magnets are polarized so as to :repel one another with the rotation being so as to separate the magnets physically as far as possible from one another.

The same magnets formerly converging then switch relative polarity from unlike to like, thus mutually repelling when diverging from one another.

The electromagnets are appropriately polarized by a switching arrangement employing brushes also mounted to the opposing faces of the rotatable members. A stationary member having appropriately energized elements is in contact with the brushes. Rotation of the members causes the brushes to make and lose contact with the energized elements to effect an appropriate polarizing sequence. Polarization of magnets of one rotating member may be constant, while polarization of magnets of the other rotating member is switched, so that paired magnets alternately attract and repel.

The reduced frequency of making and breaking magnetic fields, particularly compared to similar frequency of AC motors, enables considerable efficiencies of operation to be introduced. Not only will the motor be highly efficient, but the efficiency also translates into reduced cooling burden.

Accordingly, it is a principal object of the invention to provide an electric motor having improved performance.

A second object of the invention is to employ variable proximity of magnets to enhance magnetic attraction within an electric motor.

It is another object of the invention to exploit an arrangement of rotating members arranged at an angle to one another, so that as the members rotate, a selected arbitrary point located on one member cyclically approaches and distances itself from a corresponding point located on the other member.

It is a further object of the invention to overcome performance limitations of stationary field motors, wherein magnets do not vary mutual proximity.

Still another object of the invention is to cause pairs of corresponding magnets to vary relative polarity.

It is an additional object of the invention to switch electromagnet field currents from brushes mounted on the rotating members.

It is again an object of the invention to limit the major moving parts to two rotating members.

Another object of the invention is to provide a stationary energized member for conducting field current to the magnets of the novel electric motor.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
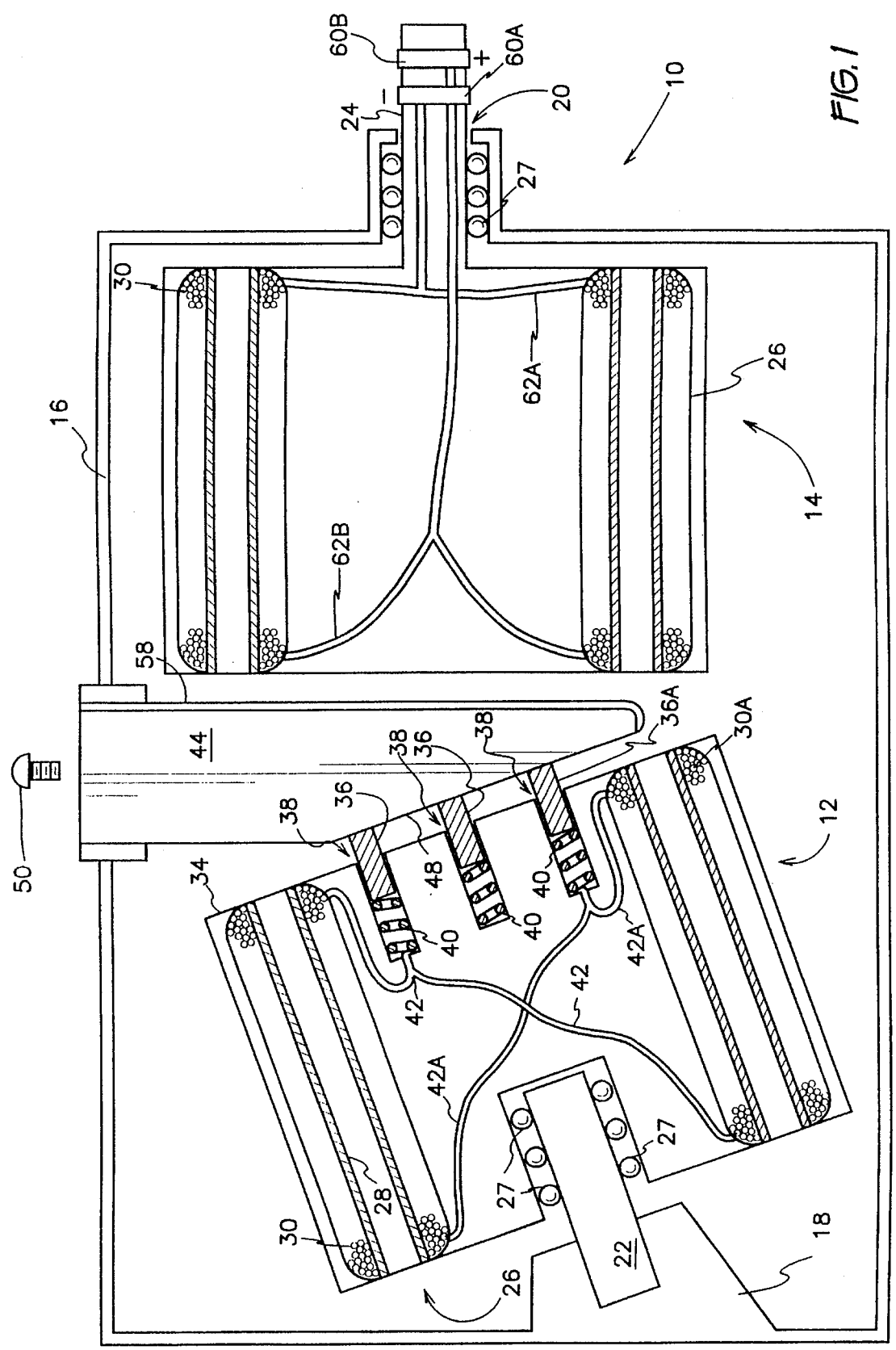
FIG. 1 is a diagrammatic, side elevational view of the novel electric motor, with one rotor shown partially in cross section.

FIG. 1 shows the novel electric motor 10 wherein rotors 12, 14 are journaled within a housing 16 at a boss 18 and an opening 20. Each rotor 12, 14 is rotatably supported on a respective shaft 22 or 24, supported on bearings 27. Shaft 24 is the motor output shaft.

Rotor 12 has four electromagnets 26 comprising a steel tube 28 and an external copper coil 30. Electromagnets 26 are arranged parallel to rotational axis 32 (see FIG. 2), and are spaced equidistantly from one another. Each tube 28 is flush with an end face 34 opposed to the other rotor 14. By this arrangement, one pole of each electromagnet 26 is oriented to project a flux field from its respective associated end face away from its associated rotor.

Rotor 12 also has four brushes 36 mounted thereto, disposed within individual electrically insulated bores 38. A spring 40 urges its respective brush out of bore 38, towards opposing rotor 14. An electrical conductor 42 electrically connects one brush 36 to one end of coil 30, and also to one end of coil 30A The other ends of coils 30,30A are connected by a conductor to brush 36A. Power energizing coils 30,30A is appropriately switched by the following arrangement.

A stationary member 44 is fixed to housing 16, and has a left contact surface 48, as seen in FIG. 1. Surfaces 48,58 are arranged at an angle to one another, the angle corresponding to the angle of rotational axes 32. In this manner, brushes 36 of rotor 12 are in constant contact with contact surface 48, even as rotors 12, 14 rotate. Electrical power from a battery (not shown) or other suitable source is connected to member 44 by securing conductors (not shown) thereto by screws 50. One screw and associated conductive portion of member 44 is connected to the positive side of the power source, and the other screw and associated conductive portion of member 44 is connected to the negative side of the power source.

The relationship between brushes 36 and member 44 is described with reference to FIG. 2. Electromagnets 26 are appropriately energized and deenergized, or energized to have an appropriate polarity, by causing brushes 36 to contact in sequence a first conductive switch surface 52 disposed upon member 44, a non-conductive surface 54, and a second conductive switch surface 56. Switch surfaces 52 and 56 and non-conductive surface 54 are even with one another, or coplanar, so that brushes 36 slide smoothly over stationary member 44. Surfaces 52 and 56 are connected to the positive and negative sides of the power source, and are not electrically in contact with one another. Each electric circuit extends from one screw 50 to its conductive surface 52 or 56, through a brush 36 and spring 40 to a conductor 42, through coils 30,30A, to another conductor 42A, through another spring 40 and brush 36A, to the other conductive surface 56 or 52. Thus, each electromagnet 26 is periodically energized and deenergized.

Rotors 12 and 14 have an equal number of electromagnets 26, each electromagnet 26 of rotor 12 being associated with a corresponding electromagnet 26 of rotor 14. For purposes of illustration, such a pair of electromagnets is designated 26A and 26B in FIG. 2.

Figure 2:
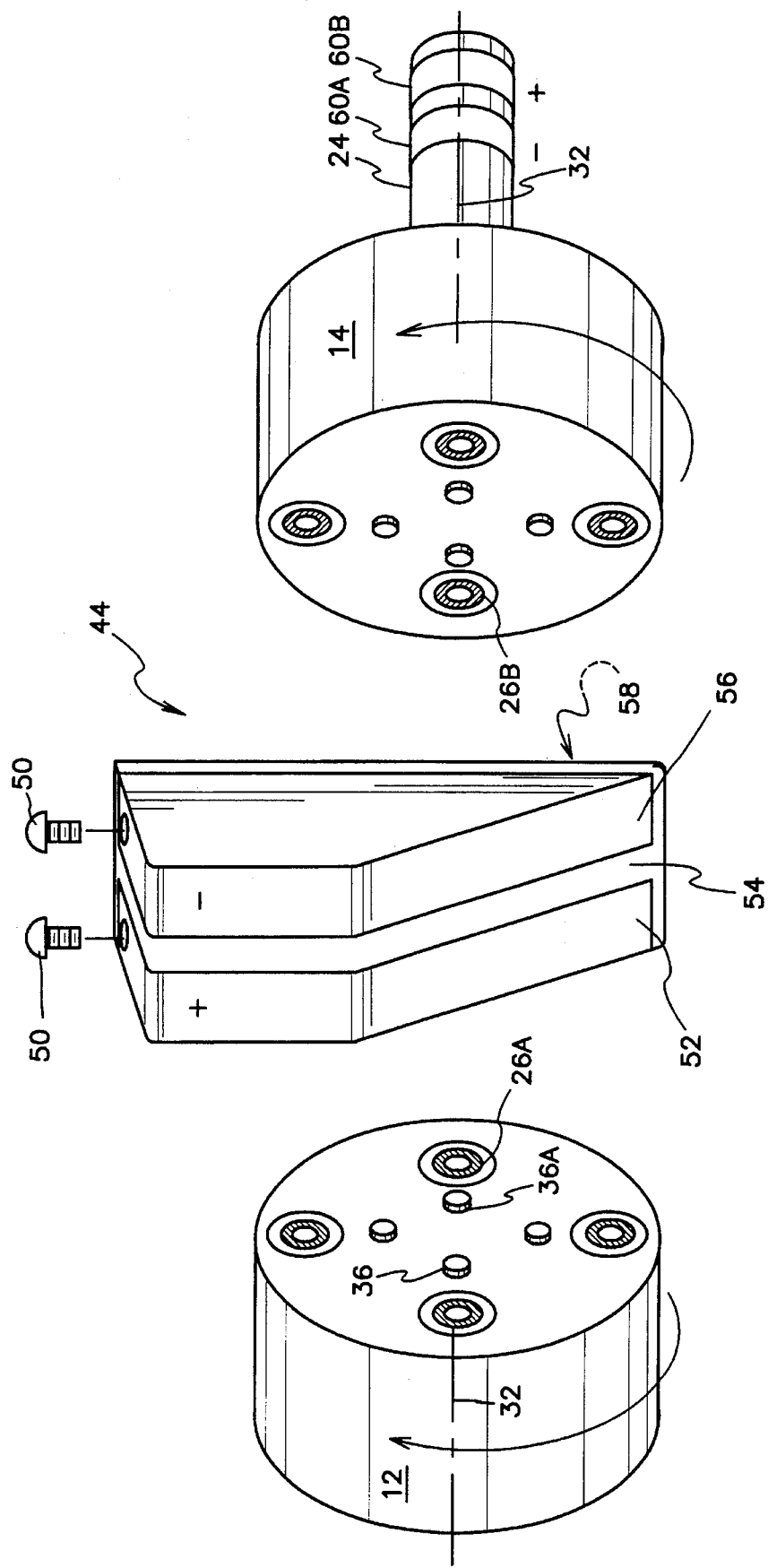
FIG. 2 is a perspective view of the three principal components of the motor, shown exploded and turned at angles to one another for clarity of view and understanding.
Figure 3:
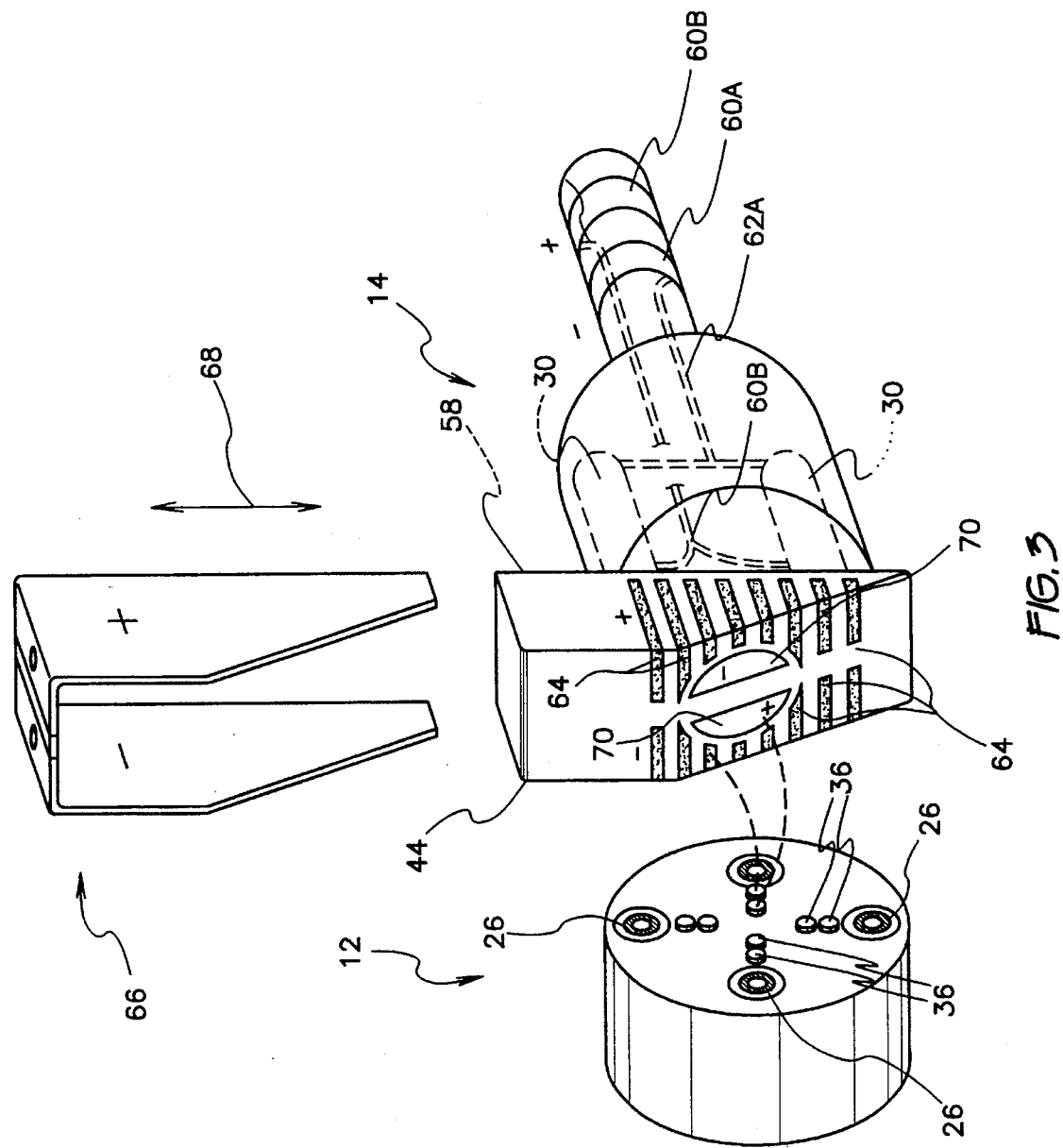
FIG. 3 is an exploded, perspective view of the three principal components of the motor, showing an embodiment incorporating a variable electrical supply to a rubbing block serving one set of magnets, and slip ring electrical feed of the other group of magnets. One rotor is shown turned at an angle for clarity.

It will further be noted that the right hand or concealed surface 58 of member 44, as depicted in FIGS. 1, 2, and 3 is non-conductive and not actively utilized in the operation of motor 10. As illustrated in FIGS. 1, 2, and 3, electromagnets 26 of rotor 14 are maintained at one polarity. This is accomplished by unswitched connection to constantly polarized slip rings 60. Conductor 62A connects slip ring 60A to one end of all coils 30 of rotor 14, and conductor 62B connects slip ring 60B to the other end of coils 30 of rotor 14.

Of course, there are four coils 30 formed in each rotor 12 or 14, two of these being omitted for clarity from each rotor 12 or 14 for clarity.

When electrical power designated as negative is connected to slip ring 60A and power designated as positive is connected to slip ring 60B, all four electromagnets 26B of rotor 14 will be of like and unchanging polarity throughout each revolution.

Simultaneously, when electrical power designated positive is connected to surface 52, and power designated negative is connected to surface 56, ensuing magnetic or flux fields generated by electromagnets 26A and 26B will attract, and electromagnets 26A and 26B will be urged toward one another. This is accommodated as rotors 12 and 14 rotate in lockstep, electromagnets 26A and 26B always aligning axially so as to minimize the space by which they are mutually separated.

Rotors 12 and 14 will turn until brush 36A crosses surface 54, then contacts surface 56. This occurs when electromagnets 26A and 26B are at the minimum separation possible. In the depiction of FIG. 2, surfaces 56 and 58 are electrically connected by an internal conductor or conductive connection (not shown) interior to stationary member 44. This connection is insulated to prevent a short circuit from developing between surface 58, now electrically in common with surface 56, and surface 52. The ensuing flux fields of electromagnets 26A and 26B will now oppose one another, and will be urged to separate from one another. As this event coincides with bottom dead center of rotors 12 and 14 in the depiction of FIG. 2, rotor rotation in the same direction will be is maintained.

It will be seen that rotors 12, 14 are arranged at an obtuse angle to one another, as shown in FIG. 1. Returning to FIG. 2, this arrangement enables paired opposing points, such as those represented by 26A and 26B to cyclically converge and diverge as rotors 12, 14 rotate synchronously. Obviously, the angle existing between rotors 12, 14 must be obtuse in order to provide for the cyclic convergence and divergence described above. The ensuing flux fields of electromagnets 26A and 26B will now oppose one another, and will be urged to separate from one another. As this event coincides with bottom dead center of rotors 12 and 14 in the depiction of FIG. 2, rotor rotation in the same direction will be is maintained.

Continuous rotation is thus effected by associated electromagnets 26 of each rotor, excepting the portion of rotation occurring when an electromagnet 26 of rotor 12 is exposed only to unenergized surface 54. Of course, surface 54 is sufficiently wide so that a brush 36 cannot span surfaces 52 and 56, which would cause a short circuit.

Brushes 36 of rotor 12 are switched in polarity so that they are of opposite polarity when approaching rotor 14, and of like polarity when diverging from rotor 14, thus promoting attraction and continued rotation. At top dead center, brushes 36 switch polarity appropriately.

FIG. 3 also illustrates a variable feed feature wherein member 44 has conductive strips 64 which receive a voltage depending upon the position of a feed member 66 slidably engaging member 44. Feed member 66 has two separated conductive portions of unlike polarity, designated positive and negative in FIG. 3.

This member 66 moves as indicated by arrow 68, and thus progressively contacts more or fewer strips 64 in so doing. Member 66 is constrained in any suitable way, such as riding within a surrounding groove (not shown) formed in a non-conductive part of the motor housing. This arrangement has the effect of increasing and decreasing duration of energization of associated electromagnets 26, thus varying power output of motor 10. Motor 10 may thus be better matched to a variable load.

Adjustment of member 66 may be by any suitable method. For example, a non-conductive handle (not shown) may be attached thereto and made accessible from the exterior of motor 10. The handle may be manually moved to a desired output. Automatic adjustment is also possible by solenoid, motorized, or still other actuation methods (not shown). These methods may be energized by appropriate transducers (not shown) which monitor motor speed or any other desired function.

Referring now to switching of rotor 12, it will be seen in FIG. 3 that there are eight brushes 36 serving four electromagnets 26. Polarizing contact with an appropriate power circuit is switched by progressive travel across stationary member 44. Brushes 36 located towards the rotational axis of rotor 12 alternately contact two semicircular electrodes 70, there being a non-conductive 6surface imposed therebetween to prevent short circuits. Brushes 36 located towards the outer surface of rotor 12 alternately contact a grid of parallel electrodes or strips 4, which do not contact one another, and are separated by non-conductive surface. This arrangement of contact is indicated by dashed lines. Of course, the designation of positive and negative throughout the drawings is for the convenience of the reader, and does not signify a particular polarity, nor necessarily a permanent polarity.

It will be apparent that as rotor 12 rotates, contact of the various brushes 36 transfers to electrodes of another polarity. In a preferred embodiment, there are at least four sets of electromagnets 26 and eight brushes 36, so that there is always at least one electromagnet 26 energized, to assure continuous rotation and to promote smooth operation.

Figure 4:
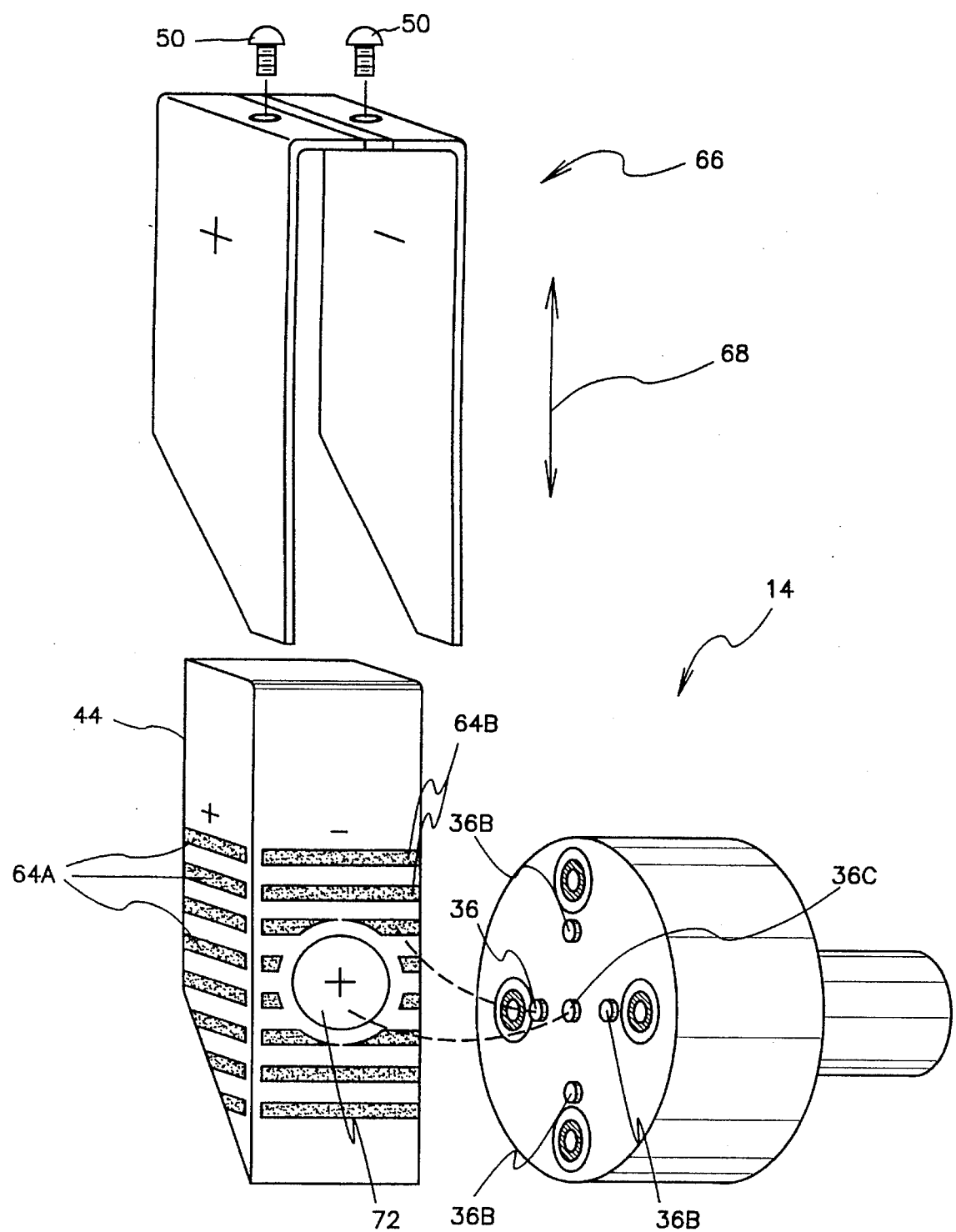
FIG. 4 is an exploded, perspective view of another embodiment of the invention, showing one rotating member, the rubbing block, and the variable electrical supply to the rubbing block.

FIG. 4 illustrates an arrangement for energizing the electromagnets of rotor 14 such that constant polarity ensues. A central brush contacts an electrode connected internally within stationary member 44 to a polarity arbitrarily designated positive in this Figure. Four outer brushes 36B contact grid electrodes 64B as described above. Brushes 36B are connected appropriately to the coils of electromagnets 26 by conductors (not shown) internal to rotor 14.

A central brush 36C constantly contacts an electrode 72 which is connected in common with the feed to electrodes 64A by a conductor (not shown) internal to member 44. Thus, all electromagnets 26 of rotor 14 are maintained at constant polarity. Electromagnets 26 of rotor 12 are switched at each half revolution.

In sum, a single revolution of one rotor 12 or 14 exposes the other rotor 14 or 12 to a series of evenly spaced magnetic interactions which provide cyclic attraction and repulsion. The number of electromagnets 26, and therefore, flux fields, of one rotor 12 or 14 is in one-to-one correlation to those of the other rotor 14 or 12. Electromagnets 26 are distributed evenly about rotational axes 32, so that torque is as even as possible.

The arrangement of member 44 and brushes 36 assures that all electromagnets 26 are energized and deenergized by one powered member, that member carrying two conductors isolated from one another.

Motor 10 can achieve high rotational speeds, and therefore, high power for its size and weight. Power is taken from shaft 24 (see FIG. 1), and also from shaft 22, if desired, by any suitable method, such as providing a keyway and key, flange and bolts, pulley, or sprocket (none of these shown).

Novel motor 10 may be varied in its precise configuration according to design considerations well known to those of skill in the art. For example, any desired number of electromagnets 26 may be provided. Shaft 22 may be fixed to rotor 12, rather than being fixed to housing 16.

Obviously, the principles set forth herein, while presented in terms of a motor, would be applicable to different types of dynamic machines. Illustratively, a dynamic brake could be based upon the inventive concept. It is to be understood that the present invention is not limited to the embodiments described above, but encompasses any and all embodiments within the scope of the following claims.

I claim:

1. An electric motor comprising:

a first rotatable member having at least one first magnet mounted thereto, a first rotational axis, and a first end face, one pole of said first magnet oriented to project a flux field from said first end face away from said first rotatable member; and a second rotatable member having at least one second magnet mounted thereto, a second rotational axis, and a second end face, one pole of said second magnet oriented to project a flux field from said second end face away from said second rotatable member;

said first rotational axis angulated with respect to and intersecting said second rotational axis with said angulated axes being sufficiently angled to generate synchronous rotation, said first end face facing said second end face, whereby the respective flux fields of said first magnet and said second magnet interact with one another to effect opposing magnetic fields located at variable proximity to one another, thereby inducing rotation of said first and second rotatable members responsive to electrical power imposed upon said first and second magnets.

2. The electric motor according to claim 1, said first rotatable member having a plurality of first magnets distributed uniformly around said first rotational axis, whereby a single revolution of said first rotatable member exposes said second rotatable member to a series of evenly spaced magnetic interactions.

3. The electric motor according to claim 2, said second rotatable member having a plurality of second magnets corresponding in number to the number of said first magnets, said second magnets distributed uniformly around said second rotational axis, whereby there is a one-to-one correlation between flux fields imparted by said first rotatable member and flux fields imparted by said second rotatable member.

4. The electric motor according to claim 1, said first magnets being electromagnets, said electric motor also comprising circuitry for energizing said electromagnets.

5. The electric motor according to claim 4, further comprising a switch for making and breaking electric power circuits to said electromagnets.

6. The electric motor according to claim 5, each said magnet comprising a coil having two ends, and said switch comprising at least one pair of first brushes mounted to said first rotatable member, one individual brush of each said pair of first brushes electrically connected to one end of one said coil and the other individual brush of each said pair of first brushes electrically connected to the other end of one said coil, and a stationary, electrically conductive powered member contacting said brushes, whereby rotation of said first rotatable member effects switching energizing and deenergizing each said electromagnet.

7. The electric motor according to claim 6, said second magnets being electromagnets each comprising a coil having two ends, said switch further comprising at least one pair of second brushes mounted to said second rotatable member, one individual brush of each said pair of second brushes electrically connected to one end of one associated said coil and the other individual brush of each said pair of second brushes electrically connected to the other end of one associated said coil, said stationary, electrically conductive powered member also contacting said second brushes, whereby all said electromagnets are energized and deenergized by one powered member.

8. The electric motor according to claim 4, electromagnets of one said rotatable member having means for being switched to alternate polarity thereof, and said magnets of the other said rotatable member being constantly polarized.

9. The electric motor according to claim 8, further comprising electrical circuitry disposed within said rotatable member being constantly polarized, and slip rings for connecting an external energizing circuit to said electrical circuitry disposed within said rotatable member being constantly polarized.

10. An electric motor comprising:

a first rotatable member having
a plurality of first electromagnets mounted thereto,
a first rotational axis, said first electromagnets distributed uniformly around said first rotational axis, and
a first end face, each pole of said first electromagnets oriented to project a flux field from said first end face away from said first rotatable member; and a second rotatable member having
a plurality of second electromagnets mounted thereto,
a second rotational axis, said second electromagnets distributed uniformly around said second rotational axis, and
a second end face, each pole of said second electromagnets oriented to project a flux field from said second end face away from said second rotatable member;

said first rotational axis angulated with respect to and intersecting said second rotational axis with said angulated axes being sufficiently angled to generate synchronous rotation, said first end face facing said second end face, whereby the respective flux fields of said first electromagnets and said second electromagnets are located at variable proximity to one another to effect opposing magnetic fields creating a series of evenly spaced magnetic interactions, thereby inducing rotation of said first and second rotatable members responsive to electrical power imposed upon said first and second electromagnets.

11. The electric motor according to claim 10, said second electromagnets corresponding in number to the: number of said first electromagnets, whereby there is a one-to-one correlation between flux fields imparted by said first rotatable member and flux fields imparted by said second rotatable member.

12. The electric motor according to claim 11, each one of said first electromagnet and each said second electromagnet comprising a coil having two ends, said electric motor further comprising a switch for making and breaking electric power circuits to said first electromagnets and to said second electromagnets, said switch comprising:

at least one pair of first brushes mounted to said first rotatable member, each individual brush of each said pair of first brushes electrically connected to one end of one said coil, and a stationary, electrically conductive powered member contacting said brushes, whereby rotation of said first rotatable member effects switching energizing and deenergizing each said first electromagnet and each said second electromagnet.

13. The electric motor of claim 12, said second electromagnets comprising a coil having two ends, said switch further comprising at least one pair of second brushes mounted to said second rotatable member, each individual brush of each said pair of second brushes electrically connected to one end of one associated said coil, said electrically conductive powered member also contacting said second brushes, whereby all said electromagnets are energized and deenergized by one powered member.

14. The electric motor according to claim 12, first electromagnets and second electromagnets of one said rotatable member being switched to alternate polarity thereof, and first electromagnets and second electromagnets of the other said rotatable member being constantly polarized.

15. The electric motor according to claim 14, further comprising electrical circuitry disposed within said rotatable member being constantly polarized, and slip rings for connecting an external energizing circuit to said electrical circuitry disposed within said rotatable member being constantly polarized.

16. An electric motor comprising:

a first rotatable member having
a plurality of first electromagnets mounted thereto, each one of said first electromagnets comprising a coil having two ends,
a first rotational axis, said first electromagnets distributed uniformly around said first rotational axis,
a first end face, each pole of said first electromagnets oriented to project a flux field from said first end face away from said first rotatable member, and
at least one pair of first brushes mounted to said first rotatable member, one individual brush of each said pair of first brushes electrically connected to one end of one said coil and the other individual brush of each said pair of first brushes electrically connected to the other end of one said coil;

a second rotatable member having a plurality of second electromagnets mounted thereto, each one of said second electromagnets comprising an associated coil having two ends, said second electromagnets corresponding in number to the number of said first electromagnets, whereby there is a one-to-one correlation between the number of flux fields imparted by said first rotatable member and the number of flux fields imparted by said second rotatable member, a second rotational axis, said second electromagnets distributed uniformly around said second rotational axis, and a second end face, each pole of said second electromagnets oriented to project a flux field from said second end face away from said second rotatable member and toward said first end face; and a switch for making and breaking electric power circuits to said electromagnets, said switch comprising a stationary, electrically conductive powered member contacting said first brushes, whereby rotation of said first rotatable member and said second rotatable member effects switching energizing and deenergizing each said first electromagnet and each said second electromagnet, said first rotational axis angulated with respect to and intersecting said second rotational axis with said angulated axes being sufficiently angled to generate synchronous rotation, said first end face facing said second end face, whereby the respective flux fields of said first electromagnets and said second electromagnets are located at variable proximity to one another to effect opposing magnetic fields creating a series of evenly spaced magnetic interactions, and all said electromagnets are energized and deenergized by one powered member, thereby inducing rotation of said first and second rotatable members responsive to electrical power imposed upon said first and second electromagnets, electromagnets of one said rotatable member being switched to alternate polarity thereof, and electromagnets of the other said rotatable member being constantly polarized, said electric motor further comprising electrical circuitry disposed within said rotatable member being constantly polarized, and slip rings for connecting an external energizing circuit to said electrical circuitry disposed within said rotatable member being constantly polarized.

17. The electric motor according to claim 1, wherein said first and said second rotatable members are cylindrical in shape and said first and said second magnets are cylindrically shaped electromagnets with a lengthwise cylindrical axis of each of said electromagnets is parallel to said corresponding rotational axis of said rotatable member.

* * * * *